(12) United States Patent
Bell et al.

(10) Patent No.: US 7,789,220 B2
(45) Date of Patent: Sep. 7, 2010

(54) LINER PLATE REPLACEMENT

(75) Inventors: Ron Bell, Tapping (AU); Jeremy Hoslin, Merewether (AU)

(73) Assignee: Wear Applications & Management Services Pty Ltd, New South Wales (AU)

( * ) Notice: Subject to any disclaimer, the term of this patent is extended or adjusted under 35 U.S.C. 154(b) by 94 days.

(21) Appl. No.: 12/093,275

(22) PCT Filed: Nov. 1, 2006

(86) PCT No.: PCT/AU2006/001638

§ 371 (c)(1),
(2), (4) Date: Jul. 3, 2008

(87) PCT Pub. No.: WO2007/053883

PCT Pub. Date: May 18, 2007

(65) Prior Publication Data

US 2008/0277245 A1 Nov. 13, 2008

(30) Foreign Application Priority Data

Nov. 11, 2005 (AU) ............................ 2005906284

(51) Int. Cl.
*B65G 21/20* (2006.01)
(52) U.S. Cl. .................... 198/836.1; 198/825
(58) Field of Classification Search ............ 198/836.1, 198/836.3, 825
See application file for complete search history.

(56) References Cited

U.S. PATENT DOCUMENTS

| 3,024,893 | A | * | 3/1962 | Lambert | .................. 198/836.1 |
|---|---|---|---|---|---|
| 4,183,430 | A | | 1/1980 | Hunter | |
| 4,204,595 | A | * | 5/1980 | Marrs | ...................... 198/836.1 |
| 4,231,471 | A | * | 11/1980 | Gordon | ................... 198/836.1 |
| 4,641,745 | A | * | 2/1987 | Skates | ...................... 198/836.1 |
| 5,016,747 | A | | 5/1991 | Veenhof | |
| 5,048,669 | A | | 9/1991 | Swinderman | |
| 5,267,642 | A | * | 12/1993 | Gharpurey et al. | ....... 198/836.1 |

(Continued)

FOREIGN PATENT DOCUMENTS

AU 79408/01 4/2003

OTHER PUBLICATIONS

International search report (ISR) for international application No. PCT/AU2006/001638, Dec. 7, 2007.

(Continued)

*Primary Examiner*—Mark A Deuble
(74) *Attorney, Agent, or Firm*—Brown Rudnick LLP

(57) ABSTRACT

A skirt for a material transport system, eg conveyor belt (104), includes liner plates (111, 112) mounted on the conveyor side of body (200). Removal of certain plates (112) only requires access via the side of body (200) away from conveyor (104). To remove plate (112) requires removal of its support member (210) as well and so provides an aperture through which a workman can insert his hand to remove further plates (111, 112). Member (210) may be hel to body (200) using wedges inserted through eyes and this member (210) may be positioned with the aid of tabs and guides. Rubber dust seals are also provided which are clamped in place using plates and wedge arrangements. These seals must be removed prior to removal of liner plates (111, 112).

24 Claims, 16 Drawing Sheets

U.S. PATENT DOCUMENTS

| | | | | |
|---|---|---|---|---|
| 5,774,951 | A * | 7/1998 | Close et al. | 24/568 |
| 6,763,935 | B2 * | 7/2004 | Ostman | 198/836.1 |
| 7,258,228 | B1 * | 8/2007 | Herren | 198/836.3 |

OTHER PUBLICATIONS

International preliminary report on patentability (IPRP) for international application No. PCT/AU2006/001638, Dec. 6, 2007.

* cited by examiner

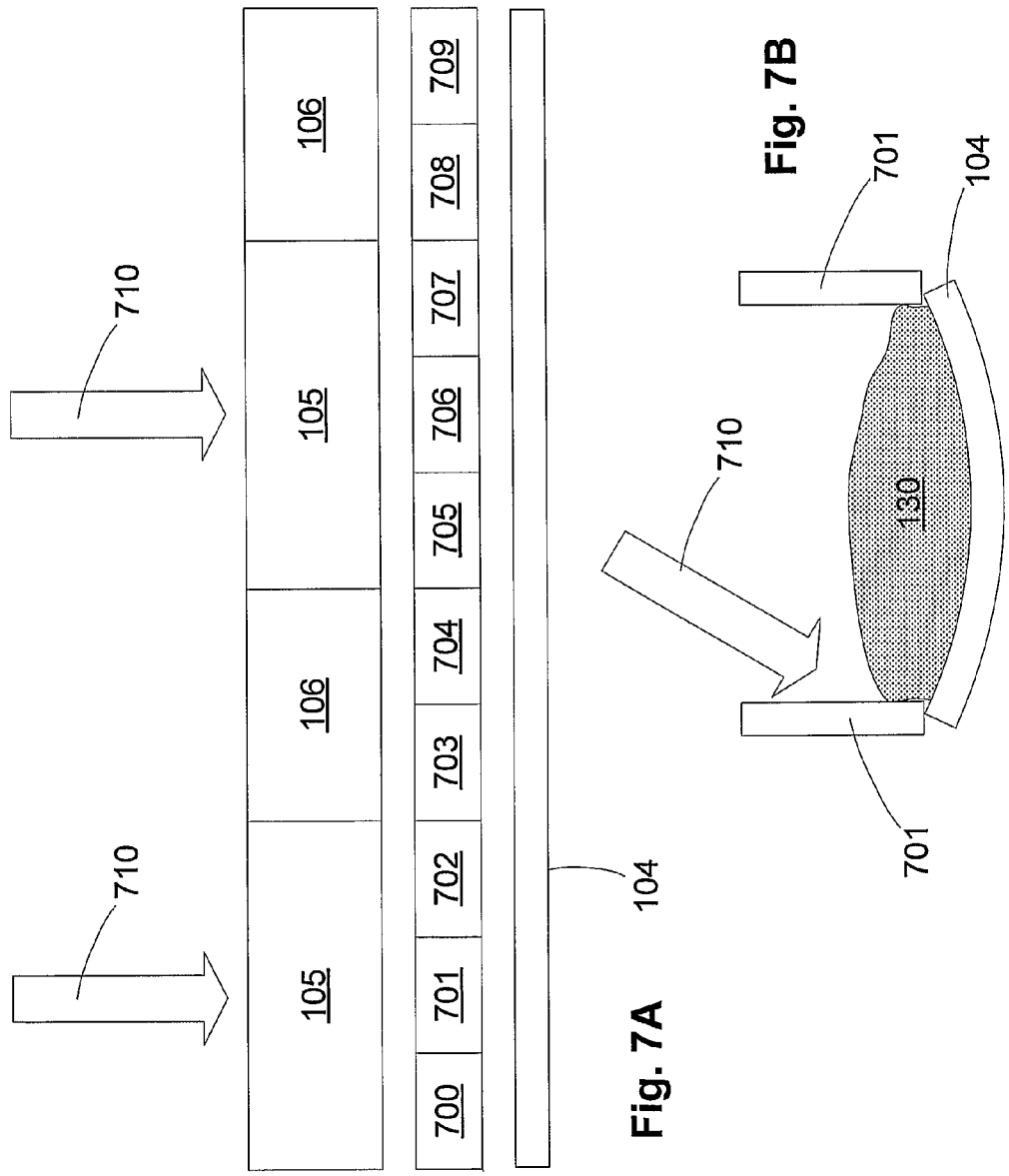

LINER PLATE REPLACEMENT

CROSS-REFERENCE TO RELATED APPLICATIONS

This application is a National Stage Entry of international application number PCT/AU2006/001638 filed Nov. 1, 2006, which claims priority to and the benefit of Australian Patent Application Serial No. 2005906284, filed Nov. 11, 2005. International application number PCT/AU2006/001638 was published as International Publication Number WO 2007/053883. The entirety of each of these patent applications is incorporated herein by reference.

FIELD OF THE INVENTION

The present invention relates to a method and apparatus for replacing wear liner plates, and in particular to replacing wear liner plates in transport systems, such as conveyor belts.

DESCRIPTION OF THE BACKGROUND ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Wear protection systems are used in heavy industries, such as the mining, quarrying and minerals processing industries, in order to protect expensive equipment from wear. In particular, when material such as ore is being transported, it is typical to direct the material using a sequence of chutes, conveyor belts, skips and the like, in order to allow the material to be provided to a desired location. During this transport process significant wear occurs between the material and the sides, walls, or floors of the transport systems.

Replacement of such transport systems is extremely expensive and time consuming, and therefore undesirable. In order to overcome this, it is therefore known to use wear protection systems such as liner plates, which are installed on surfaces of the transport system to form a sacrificial layer which protects the surfaces from wear. The liner plates can be formed from highly wear resistant materials to therefore provide an extended life, whilst additionally allowing liner plates to be replaced on a liner plate by liner plate basis, as required.

In the case of conveyor belts it is typical to provide skirting, including such liner plates, which acts to shape and guide material as it is placed on the moving belt, as well as acting to ensure the material stays confined to the belt. This is particularly important at transfer points where material is loaded onto the belt, as impact with the moving belt creates turbulence in the material flow, distributing the material across the width of the conveyor.

To provide suitable confinement, it is typical to use a combination of inwardly provided wear liner plates, to direct larger particulate material, with outwardly provided rubber seals being used to prevent escape of dust and fine grain particles.

The wear liner plates undergo constant wear, such as abrasion from moving material, and therefore require periodic replacement. However, to ensure correct positioning of the liner plates, whilst allowing the conveyor system to remain sealed by the rubber seals, it is typical for the liner plates to be mounted internally within the conveyor system. As a result, when liner plates need to be inspected or replaced for maintenance purpose, it is usually necessary to climb inside the conveyor system. This is both hazardous and time consuming, and consequently expensive both from the point of view of ensuring health and safety requirements are met, and due to the length of time the conveyor system is inoperative.

A solution to this is proposed in AU714374, which describes a clamping arrangement for a skirt. The arrangement clamps a rubber seal against an elongate side frame of a skirt panel, allowing the seal to be removed from the outside of the conveyor belt system. A panel is provided that can be removed to allow an operator access to the inside of the conveyor system. This allows the operator to unbolt the liner plate from the inside of the conveyor system.

However, this system suffers from a major of drawback. In particular, the liner plates can only be inspected once they are removed, which in turn requires complete removal of the liner plate from the skirt system, which is a time consuming task. Additionally, the configuration provides only limited sealing, and consequently dust tends to escape. Additionally and as a consequence of this, the rotating elements such as the clamping mechanism, handles and the like, seize due to corrosion and material ingress.

A further issue with this system is that liner plates are subject to different amounts of wear, depending for example on their location along the conveyor belt. However, in the system of AU714374, wear can only be assessed by removal of liner plates, which in turn requires an operator to insert their arm into the conveyor system to remove the liner plate.

SUMMARY OF THE PRESENT INVENTION

In a first broad form the present invention provides a skirt for a material transport system, the skirt including a number of liner plates mounted on a first side of a body so as to face the transport system in use, at least one liner plate being removably mounted to the body so as to allow the at least one liner plate to be detached from the body from a second side of the body opposite the first side.

Typically the at least one liner plate is mounted on a support member, the support member being removably mounted to the body.

Typically the support member includes at least two tongues adapted to cooperate with corresponding eyes on the body such that insertion of a wedge into each eye retains the support member in place.

Typically when the support member includes tabs, and the body includes guides positioned on the second side, the tabs and guides cooperating to assist in aligning the support member.

Typically the body defines an opening extending from the second side to the first side, and wherein the support member is coupled to the second side of the body, with the liner plate extending through the opening.

Typically when the support member is removed from the body, the opening provides access to the first side of the body.

Typically the skirt includes at least one rubber seal removably mounted to the second side of the body, and wherein, in use, the rubber seal is removed to provide access to the at least one liner plate.

Typically the body includes a number of eyes provided on the second side of the body such that insertion of a wedge into each eye retains the seal in place.

Typically the skirt includes first and second spaced rubber seals removably mounted to the second side of the body, and wherein, in use, each rubber seal is removed to provide access to the at least one liner plate.

Typically the skirt includes a number of wear zones and at least one liner plate in each zone being removably mounted to the body so as to allow the at least one liner plate to be detached from the body from a second side of the body opposite the first side.

Typically the material transport system is a conveyor belt.

In a second broad form the present invention provides a skirt for a material transport system, the material transport system being substantially enclosed and the skirt including a number of liner plates, at least one of the liner plates being removably mounted without requiring access to an inside of the transport system.

BRIEF DESCRIPTION OF THE DRAWINGS

An example of the present invention will now be described with reference to the accompanying drawings, in which.

DETAILED DESCRIPTION INCLUDING BEST MODE

Figure 1A:
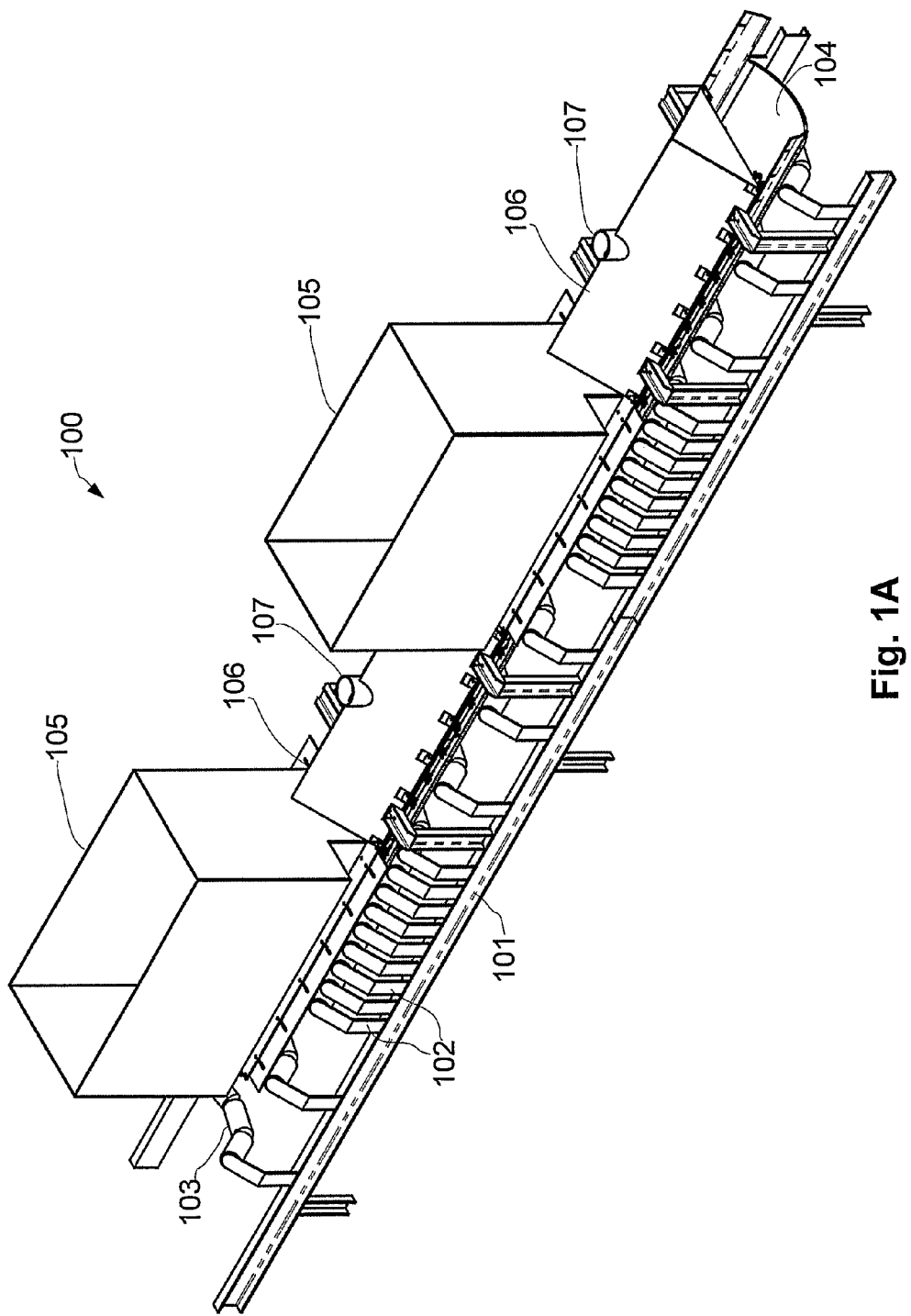
FIG. 1A is a perspective view of an example of a conveyor belt system.

An example of a conveyor system incorporating a skirt system will now be described with reference FIGS. 1 to 5.

FIGS. 1A to 1D show a conveyor system 100 formed from a frame 101 including a number of supports 102 having rollers 103 mounted thereon. An endless belt 104 is entrained around the rollers 103, and additional support and/or drive rollers (not shown) to form a conveyor belt, as will be appreciated by persons skilled in the art.

Positioned along the length of the frame 101 are a number of chutes 105, and hoods 106, having vent apertures 107 therein. In use, the chutes 105 allow material to be received from an appropriate source, such as another transport system or the like, and directed onto the endless belt 104, allowing the material to be transported to a delivery location. The hoods 106 enclose the conveyor belt system to prevent dust or other small particulate material from being dissipated into the surrounding environment. To assist with this, the aperture vents 107 can be connected to a suitable extraction system, to allow excess dust to be extracted, as will be appreciated by persons skilled in the art.

Figure 1B:
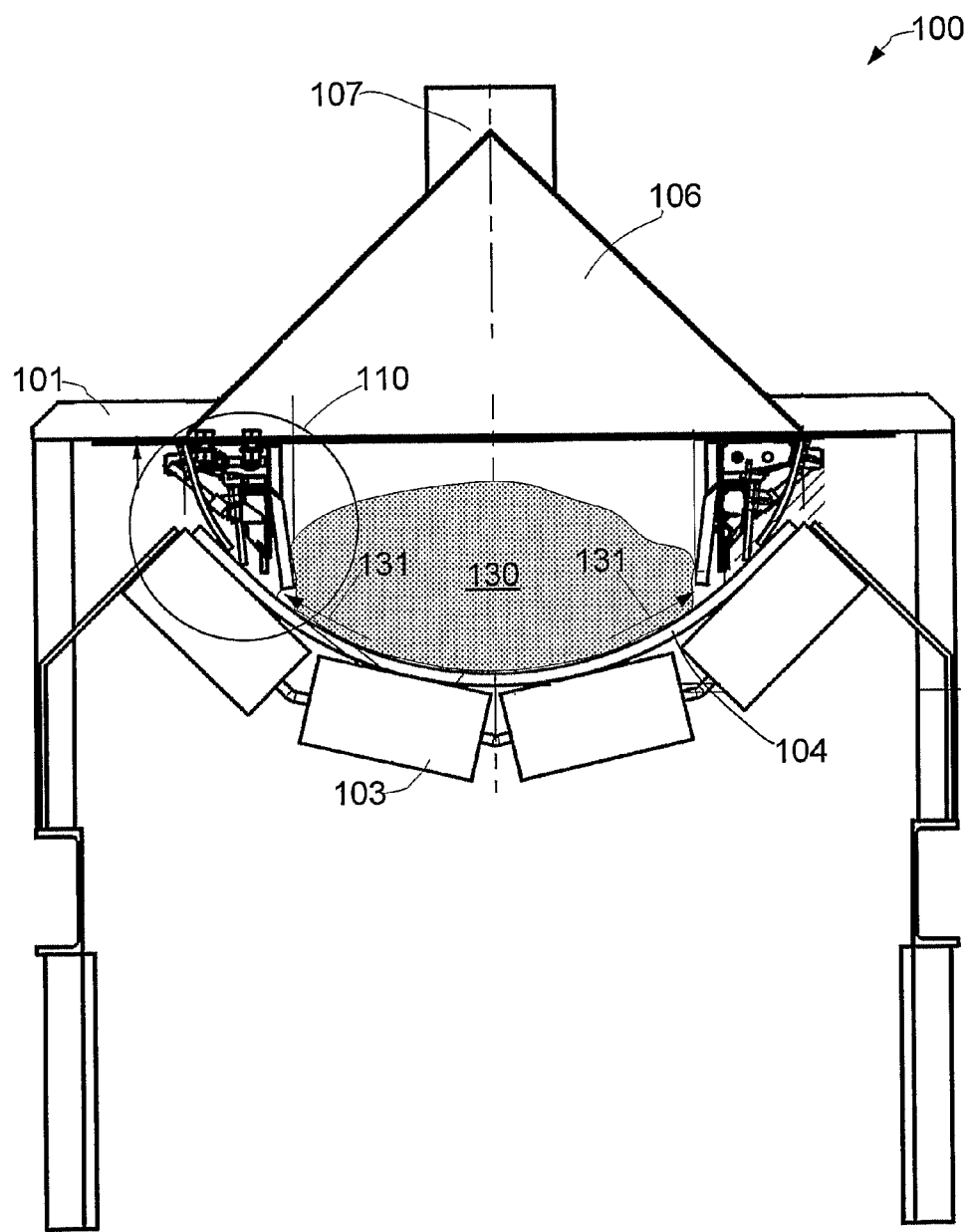
FIG. 1B is an end view of the conveyor belt system of FIG. 1A incorporating a skirt system.
Figure 1C:
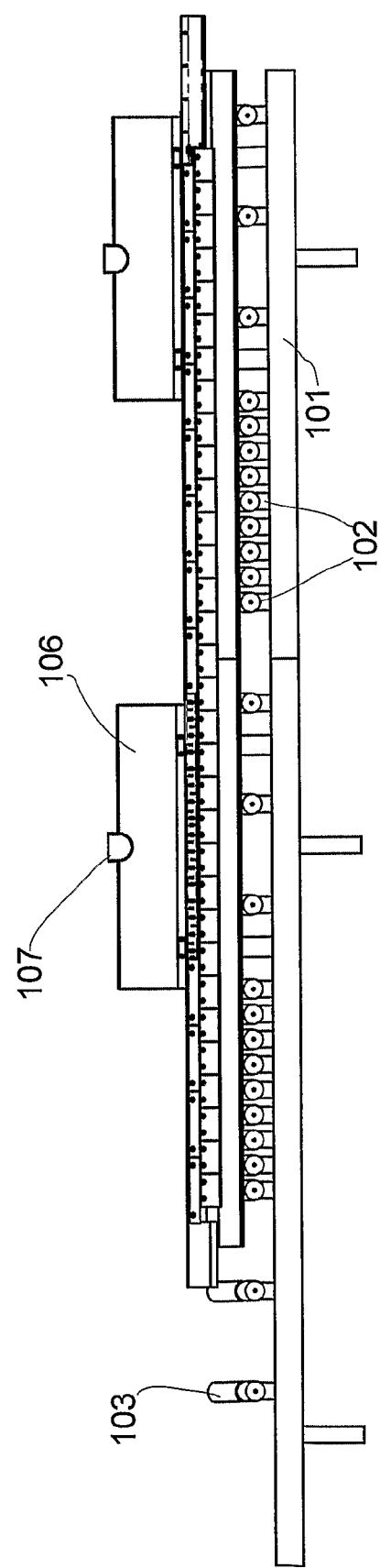
FIG. 1C is a side view of the conveyor belt system of FIG. 1A incorporating a skirt system.
Figure 1D:
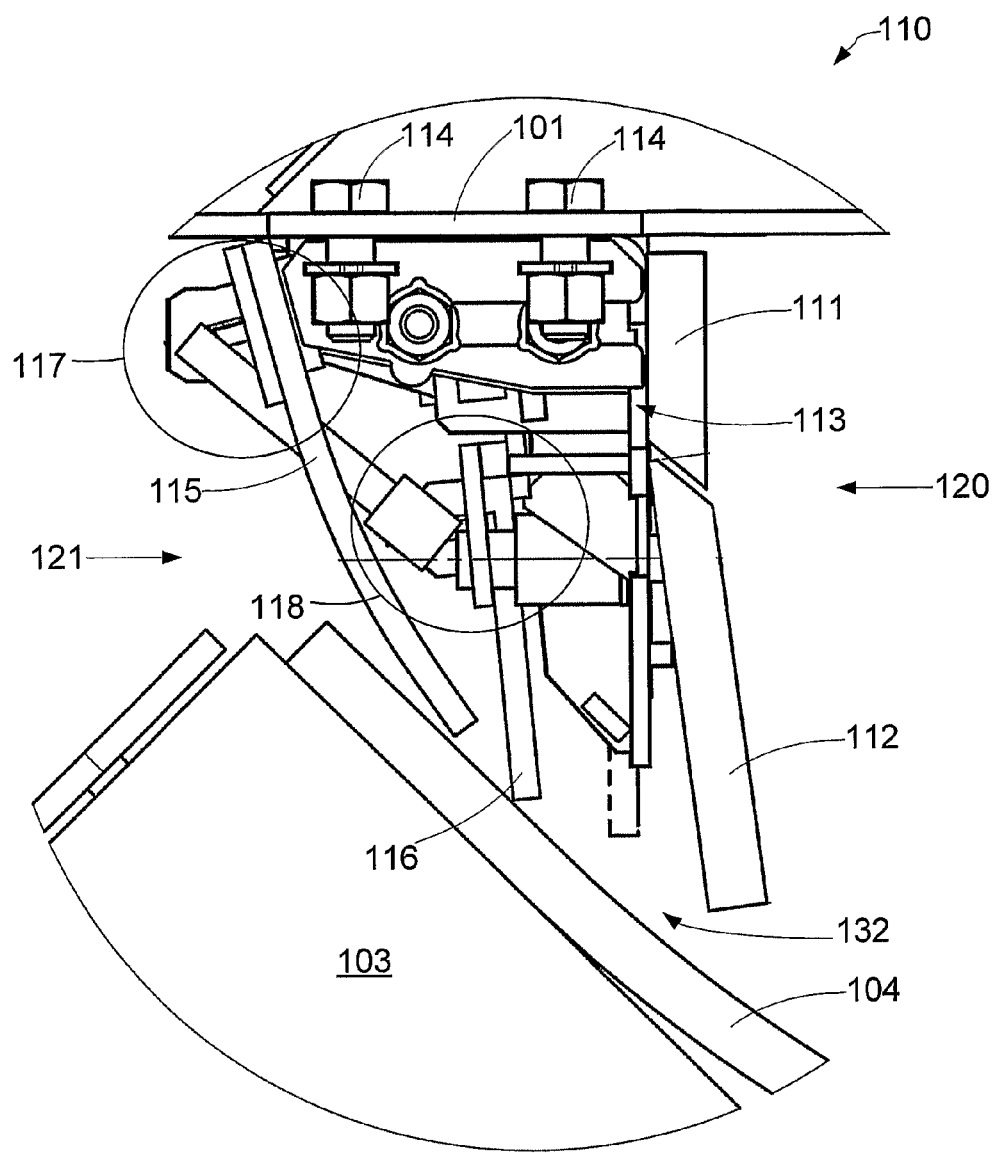
FIG. 1D is a schematic diagram of an example of the skirt system of FIG. 1B.

To assist with material transport, a skirt is provided as shown generally at 110 in FIG. 1B. This is used to prevent particulate material, shown generally at 130, from exiting the conveyor belt in the direction of the arrows 131, as will be described in more detail with respect to FIG. 1D.

As shown, the skirt 110 includes first and second wear liner plates 111, 112 mounted on a first side 120 of a skirt mounting system 113, which is in turn coupled to the frame 101, via mounting bolts 114, as shown. In this example, first and second rubber seals 115, 116 are coupled to the mounting system 113 via respective clamping arrangements shown generally at 117, 118.

In use, the first and second liner plates 111, 112 are intended to prevent larger particulate material from moving in the direction of the arrow 131. Whilst small particulate material may pass under the wear line plate 112 as shown by the arrow 132, such material is prevented from escaping from the conveyor system by the first and second rubber seals 115, 116.

The skirt 110 is arranged with at least one of the second liner plates 112 coupled to the skirt mounting system 113, so that the second liner plate 112 can be detached from a second side 121 of the skirt mounting system 113. This allows the at least one second liner plate 112 to be removed from outside the conveyor belt system, without requiring access to the inside of the conveyor belt system.

An example skirt mounting system will now be described in more detail with respect to FIGS. 2 and 3.

Figure 2A:
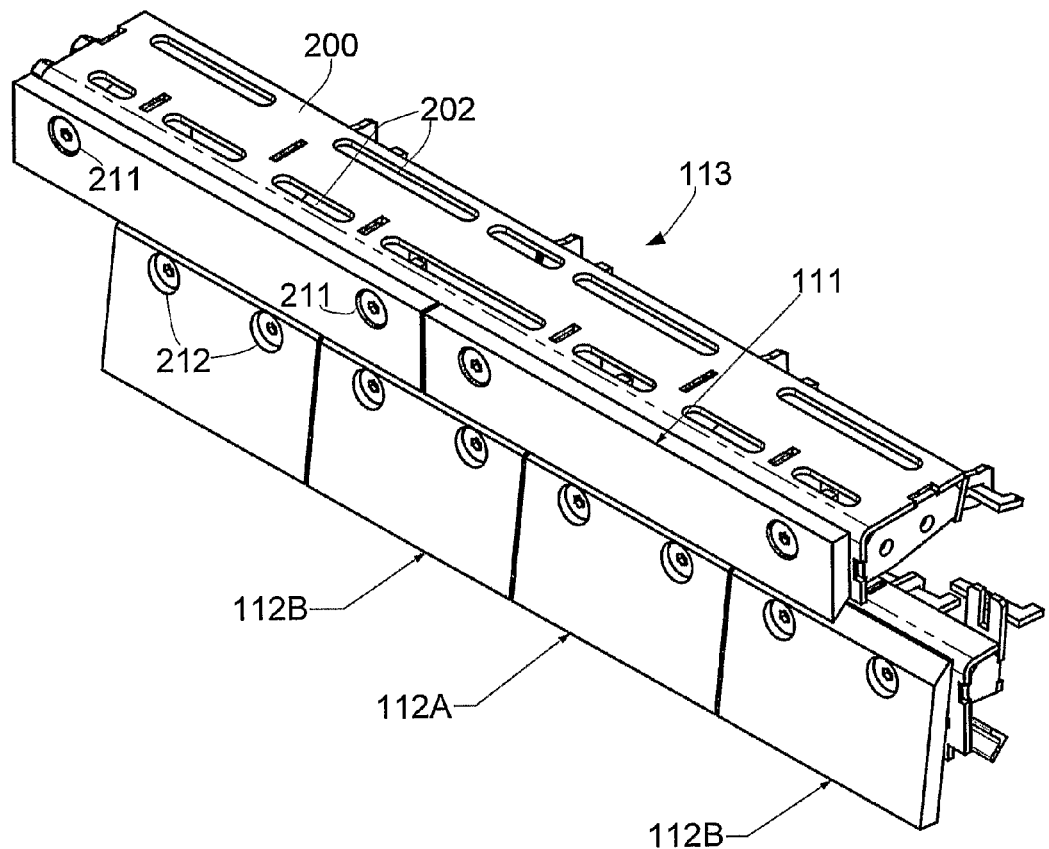
FIG. 2A is a front perspective view of an example of a skirt mounting system for use in the skirt system of FIG. 1D.
Figure 2B:
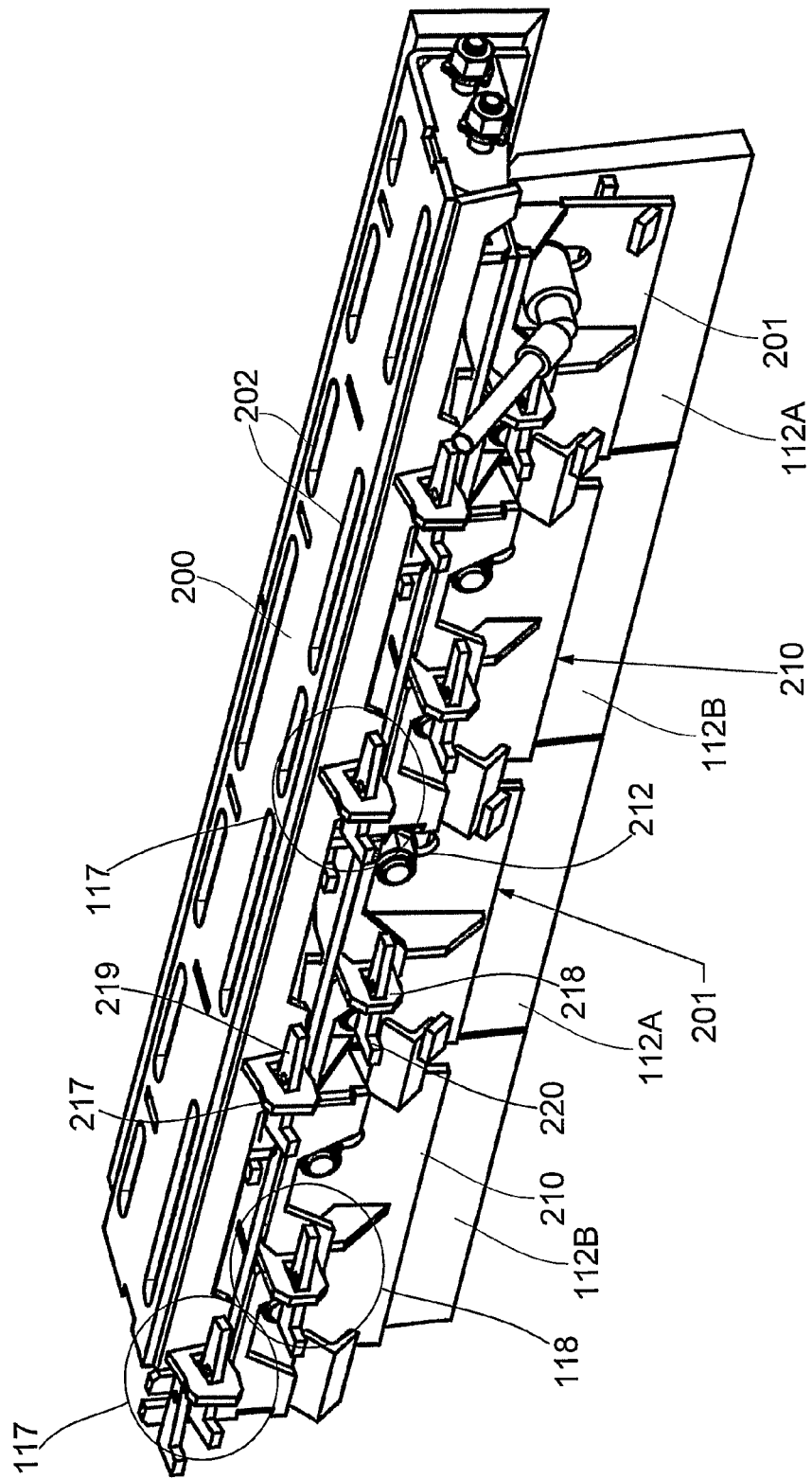
FIG. 2B is a rear perspective view of the skirt mounting system of FIG. 2A.
Figure 2C:
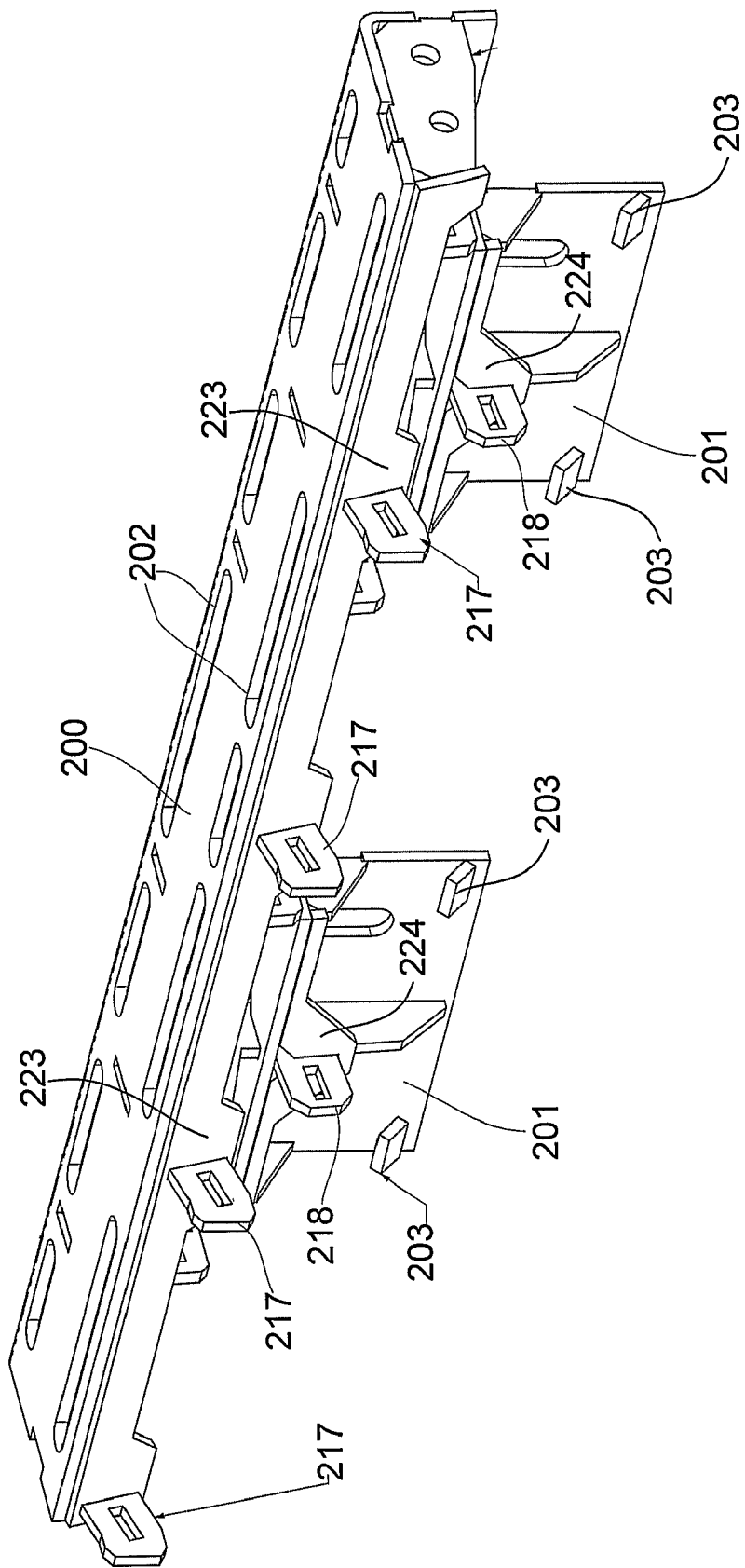
FIG. 2C is a rear perspective view of an example of a support body for use in the skirt mounting system of FIG. 2A.
Figure 2D:
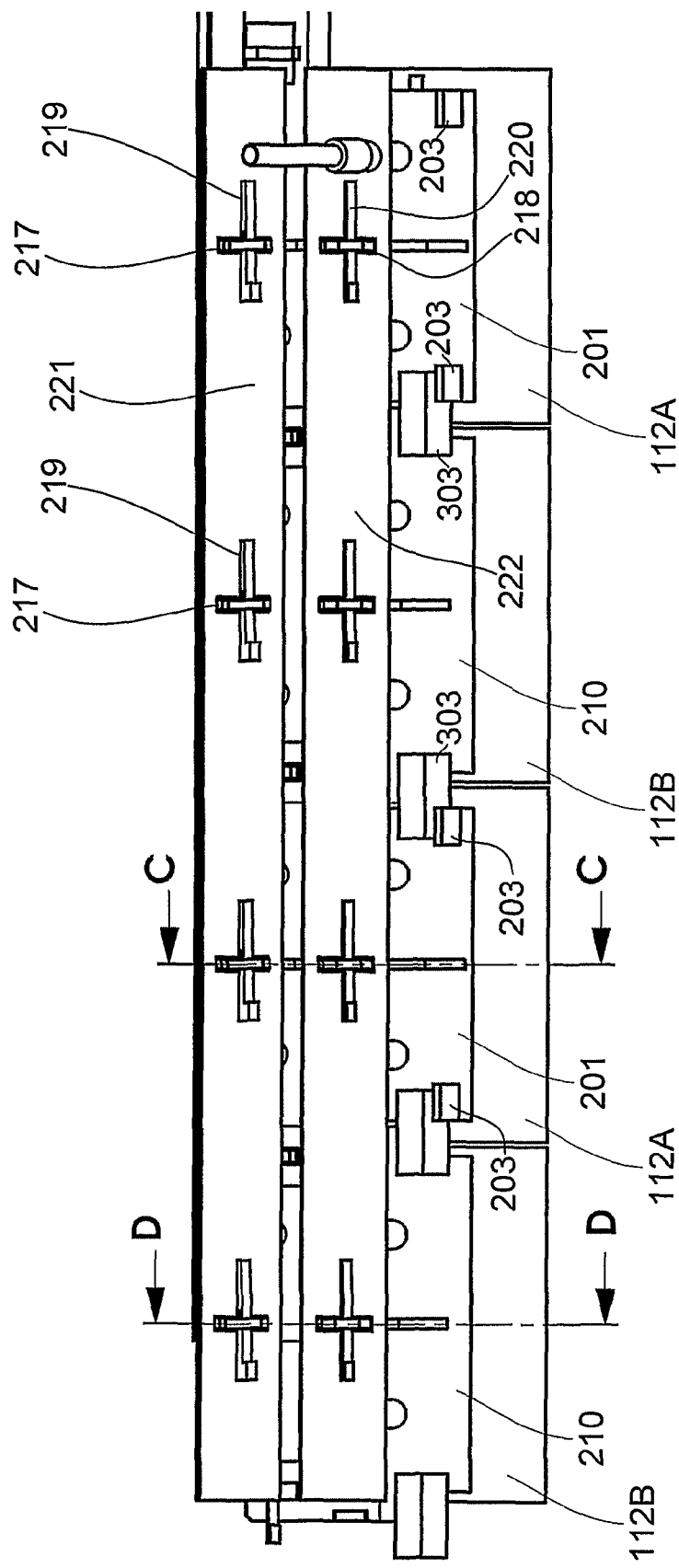
FIG. 2D is a rear view of the skirt mounting system of FIG. 2A.

The mounting system 113 is formed from a support body 200 having a number of liner plate supports 201 extending therefrom, as shown in FIG. 2C. The support body 200 includes a number of apertures 202 for receiving the mounting bolts 114, with the first liner plates 111 are coupled to the support body 200, using mounting bolts 211, as shown.

The support system also includes eyes 217, 218, and support faces 223, 224, which form part of the clamping arrangements 117, 118, as will be described in more detail below.

Alternate second liner plates 112A are connected to the liner plate supports 201, using mounting bolts 212, whilst each intermediate second liner plate 112B is connected to a respective support member 210, using mounting bolts 212. The support members 210 are shown in more detail in FIGS. 3A to 3C.

As shown each removable support 210 is formed from a body 300 having a planar support face 301, and an eye 318 and support face 324, which form part of the clamping arrangement 118. The support face 301 also includes tabs 303 that are adapted to cooperate with corresponding guides 203 provided on the plate supports 201, to assist with positioning of the support member 210 as will be described in more detail below.

The body 300 also includes tongues 310, having an aperture 311, for coupling the support member 210 to the support body 200.

Figure 2E:
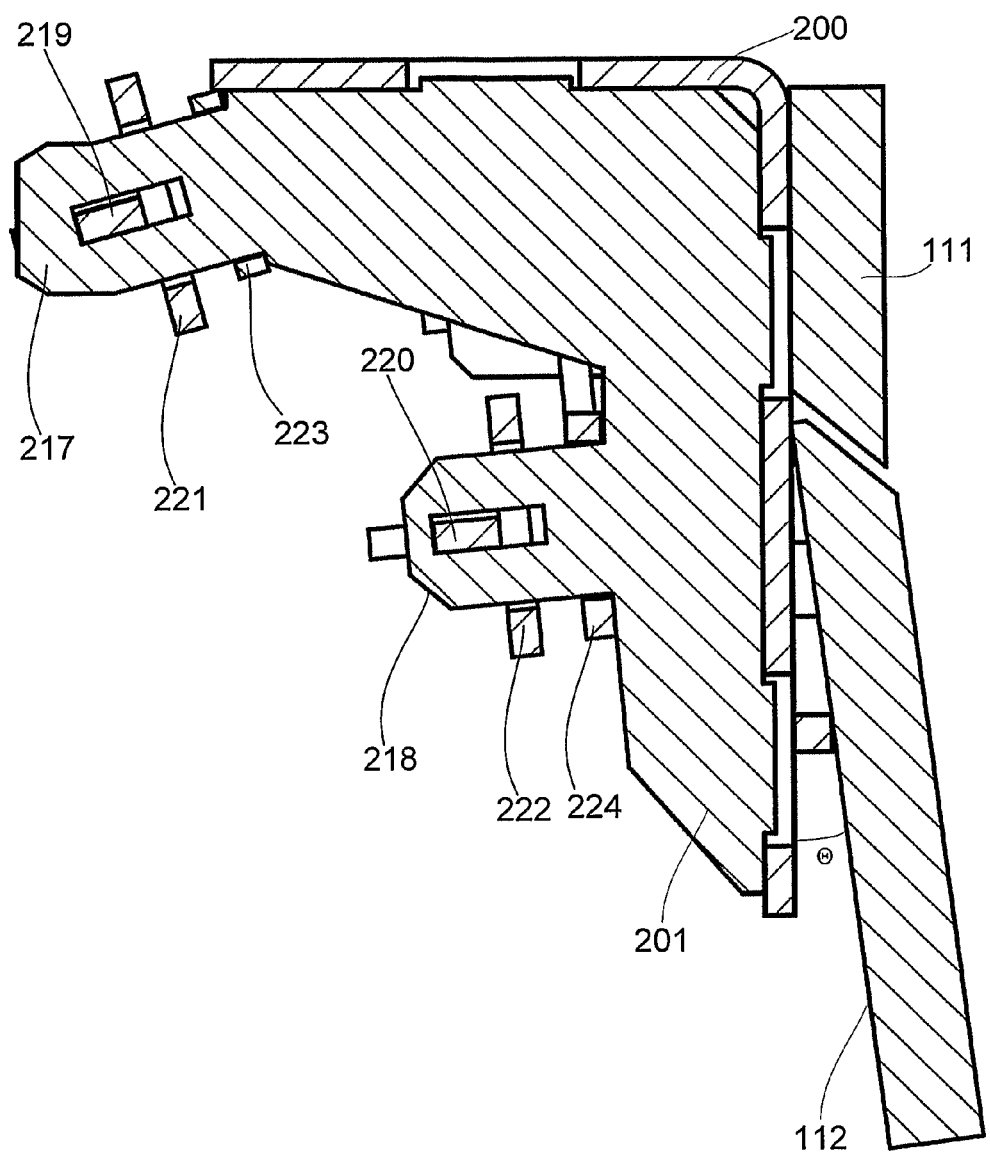
FIG. 2E is a cross sectional view of the skirt mounting system along the line C-C' of FIG. 2D, through the support body.
Figure 3A:
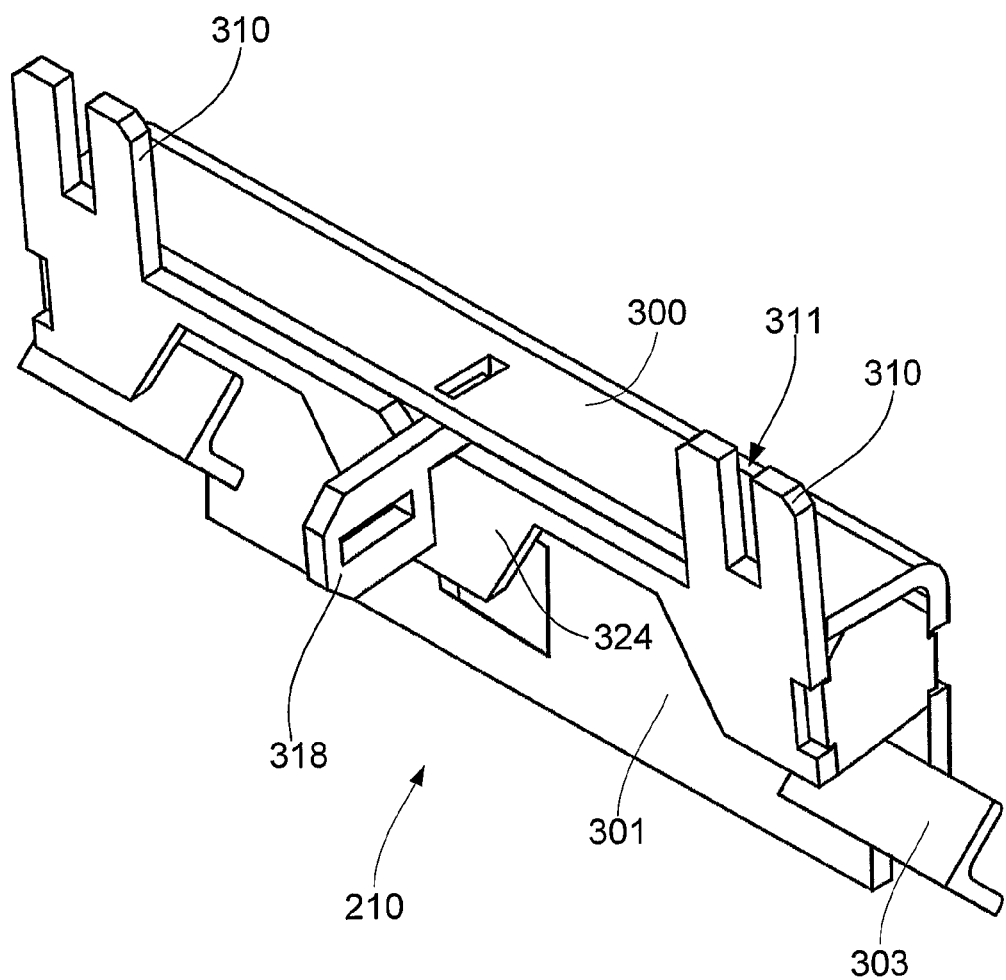
FIG. 3A is a perspective view of an example of a support member for use in the skirt mounting system of FIG. 2A.
Figure 3B:
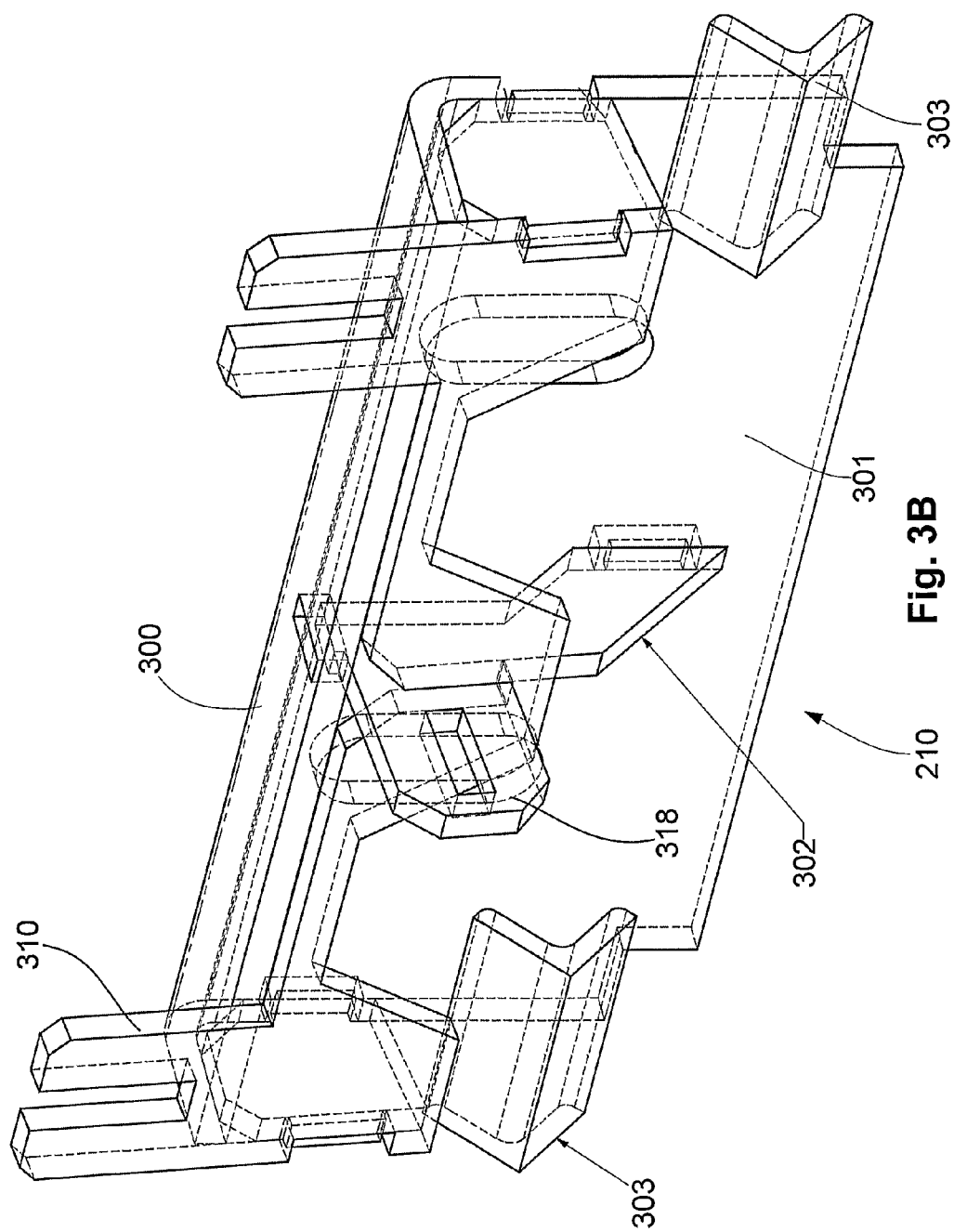
FIG. 3B is a second perspective view of the support member of FIG. 3A.
Figure 3C:
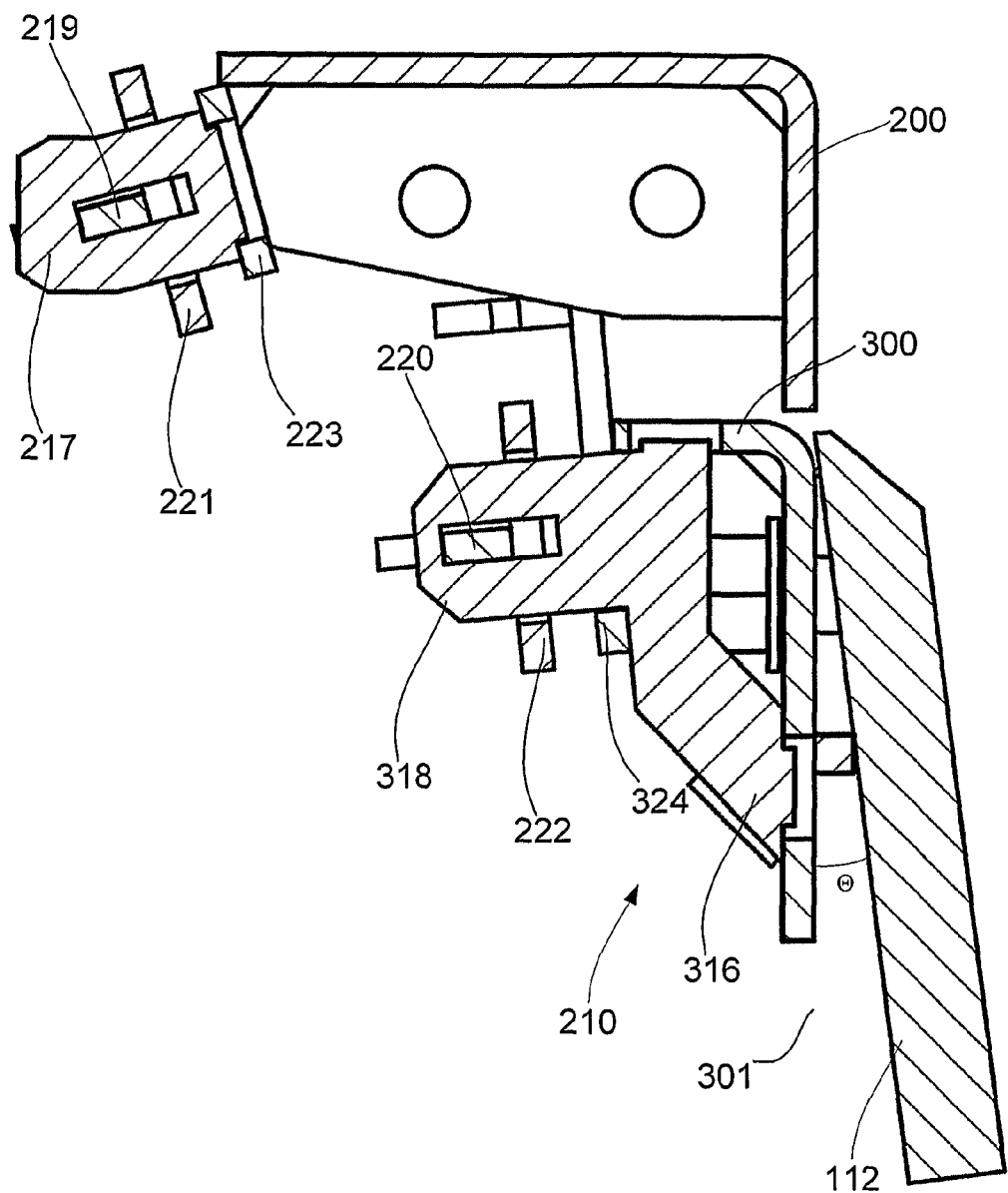
FIG. 3C is a cross sectional view of the skirt mounting system along the line D-D' of FIG. 2D, through the support member.
Figure 4A:
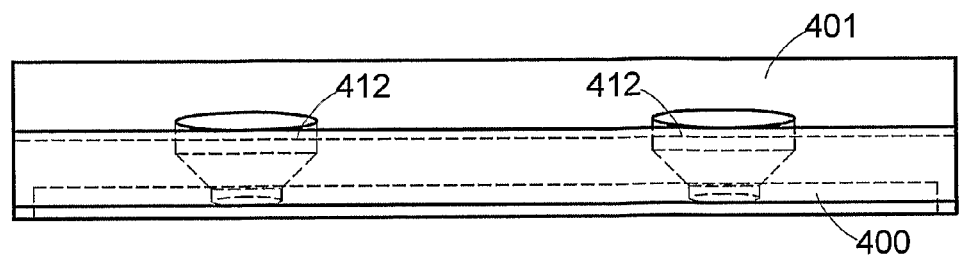
FIGS. 4A to 4C are schematic diagrams of the second liner plate for use in the skirt system of FIG. 1D.
Figure 4B:
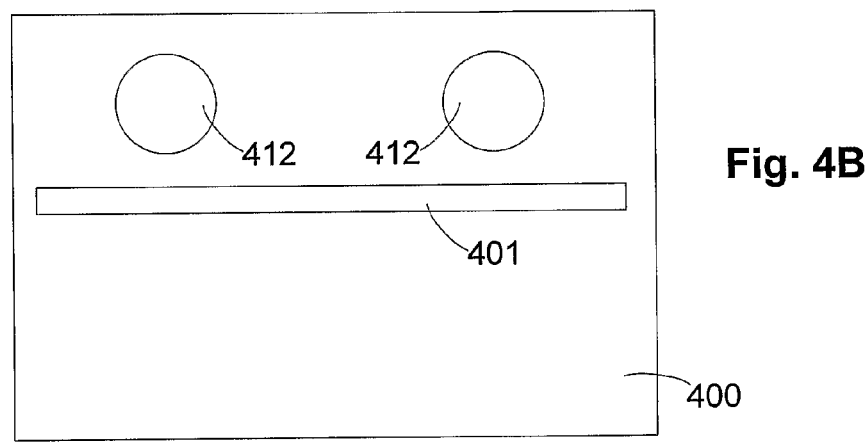
Figure 4C:
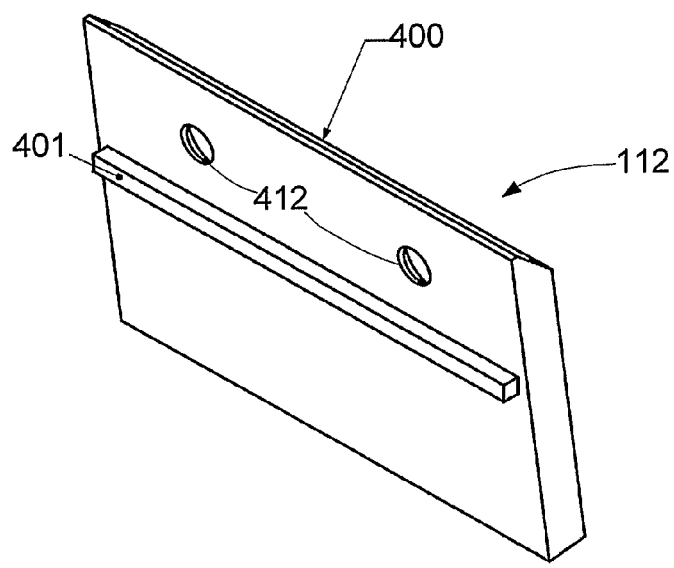

An example of the second liner plates 112A, 112B is shown in FIGS. 4A to 4C. In this example, each second liner plate 112 is formed from a body 400 having a ridge 401 provided thereon. In use the ridge 401 operates to support the liner plate 112 at an angle $\Theta$ relative to the liner plates supports 201, and the support face 301 as shown in FIGS. 2E and 3C respectively. The liner plate also includes apertures 412 for receiving the mounting bolts 212.

Figure 5A:
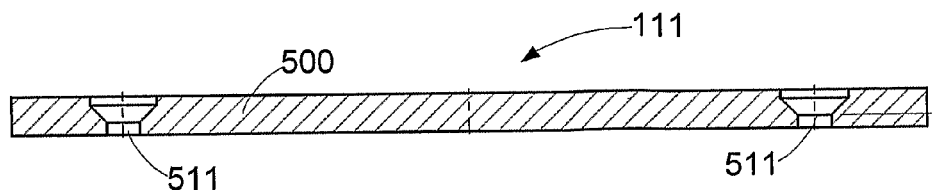
FIGS. 5A to 5C are schematic diagrams of the first liner plate for use in the skirt system of FIG. 1D.
Figure 5B:
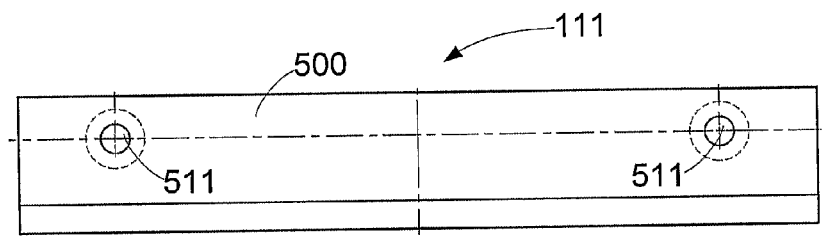
Figure 5C:
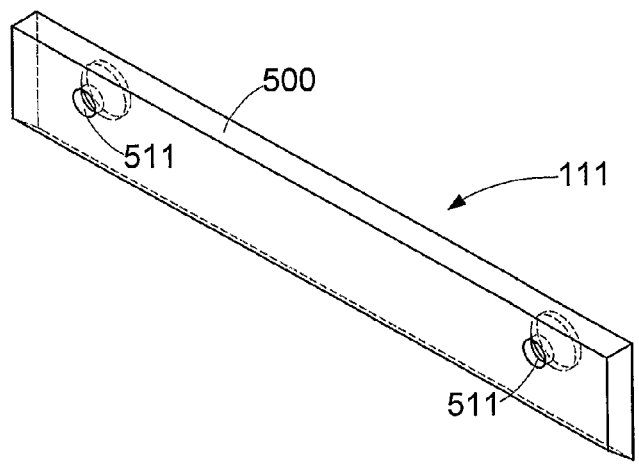

Similarly, the first liner plate 111 is shown in FIGS. 5A to 5C, and this includes a body 500 having apertures 501 for receiving mounting bolts 211.

Figure 6A:
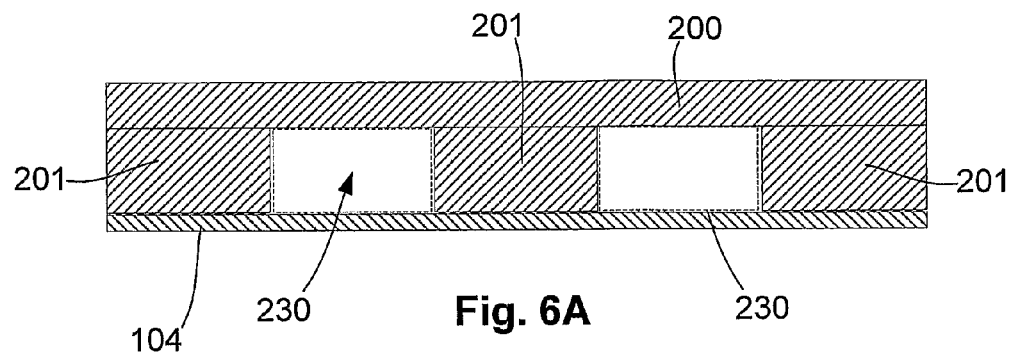
FIGS. 6A to 6D are schematic diagrams of the process of fitting the support member of FIG. 3A to the support body of FIG. 2C; and, FIG. 7 is a schematic side view of a conveyor and a number of liner plates.

In use, the first liner plates 111 are bolted to the support body 200, and the alternate second liner plates 112A are bolted to the plate supports 201. With the support members 210 removed, as shown in dotted lines in FIG. 6A, access to the first and alternate second liner plates 111, 112A can be achieved by having a fitter insert their hands in through apertures 230 left by the absence of the support 210.

Figure 6B:
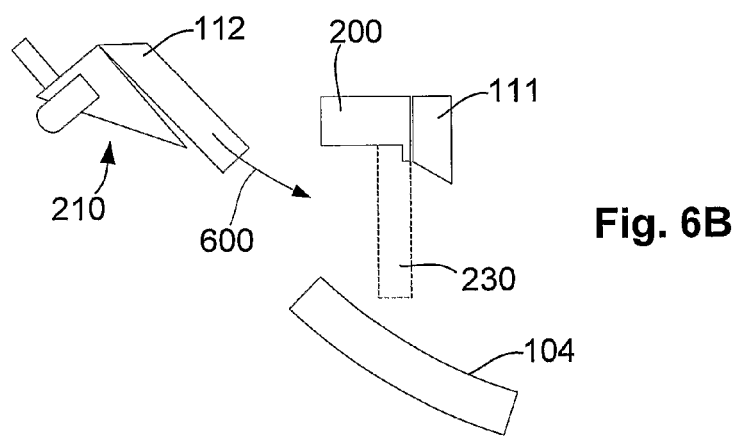

Once the first and alternate second liner plates 111, 112A are correctly configured, the intermediate liner plates 112B can be bolted to respective support members 210, and then mounted to the support body 200. To achieve this, the support member 210 orientated at an angle, as shown in FIG. 6B, and inserted into the aperture 230 as shown by the arrow 600, until the support member is provided at the positioned shown in FIG. 6C. At this point the tabs 303 are inserted into the guides 203, to thereby ensure that the support member 210 is correctly positioned.

This helps ensure that all of the second liner plates 112 are aligned with each, so that a flat wear surface faces the conveyor belt, thereby reducing the chance of material gouging the edge of one of the liner plates 112.

Figures 6C, 6D:
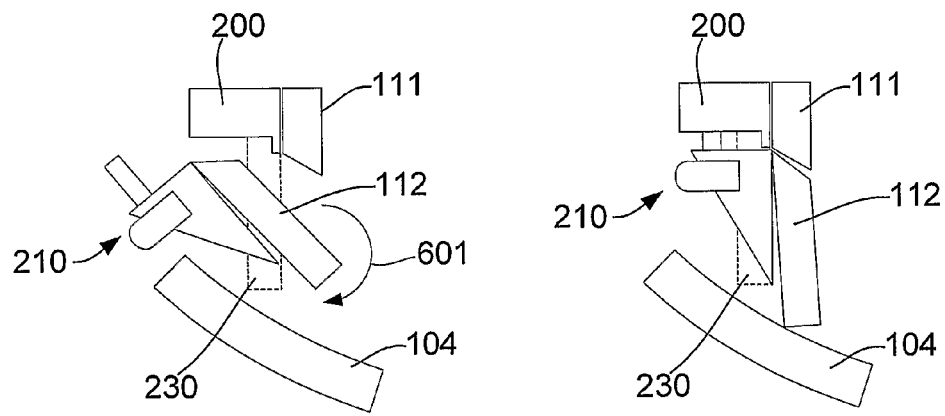

The support member 210 is then rotated, as shown by the arrow 601, to orientate the support member 210 as shown in FIG. 6D.

At this point the tongue 310 aligns with an eye (not shown) mounted to the support body 200, so that the eye extends through the tongue aperture 311. A wedge can then be inserted into the eye to urge the tongue 310 against the support body 200, thereby clamping the support member 210 in position. This operates in a similar manner to the clamping arrangements, which will be described in more detail below.

In this instance, the eye is effectively positioned on the second side 121 of the skirt mounting system 113, thereby allowing the support member 210 to be removed by an individual only having access to the second side 121 of the skirt mounting system 113, which corresponds to the outside of the conveyor system 100 in use.

Once the support members 210 are mounted, the second rubber seal 116 can be placed against support faces 224, 324 of the support body 200 and the support member 210. A back plate 222 is then positioned against the second rubber seal, with wedges 220 being inserted into the eyes 218, to thereby urge the back plate 222 against the second rubber seal 116. As a result, the second rubber seal 116 is clamped in place between the back plate 222 and the support faces 224, 324.

Similarly, the first rubber seal 115 is then aligned with the support face 223, before back plate 221 is positioned and wedges 219 inserted into the eyes 217, thereby clamping the first rubber seal 115 between the back plate 221 and the support face 223.

It will be appreciated that in the event that liner plates 111, 112 require maintenance, inspection or replacement, the above sequence of steps can be followed in reverse.

Thus, the wedges 219 are removed, thereby allowing removal of the back plate 221 and the first rubber seal 115. This in turn provides access to the second rubber seal 116, which can in turn be removed by removing the wedges 220 and the back plate 222. Following this, selected ones of the support members 210 can be removed in a similar manner, thereby removing corresponding ones of the second liner plates 112.

The removed second liner plates 112 can be easily examined, allowing an assessment of the current wear levels of each of the liner plates 112A, 112B. In particular, in general wear liner plates in similar regions of the skirt system will incur similar levels of wear. Accordingly, by examining suitable removed liner plates 112B, this allows an assessment of whether unremoved liner plates 111, 112A should be examined more thoroughly to determine if replacement is required.

In this event that alternate second liner plates 112A, or the first liner plates 111 require inspection or removal, this can be achieved by having a fitter insert their arm through the aperture 230, allowing the liner plates to removed using suitable tools.

An example of this will now be described with reference to FIGS. 7A and 7B. In this example, the liner plates are generally designated at 700, 701, . . . 709. In this example, material enters the conveyor system via the chutes 105, as shown by the arrow 710. In this situation, it is apparent that material may impact on the liner plates, such as the liner plate 701, which are aligned with the chutes. As a result, it is generally the case that liner plates aligned with chutes will suffer greater wear than liner plates aligned with the hoods 106.

To take this into account different wear zones can be provided, in which it is assumed that all plates within the zone will wear at a similar rate. In this example, it is therefore possible to define four wear zones as follows:

Zone A—liner plates 700, 701, 702
Zone B—liner plates 703, 704
Zone C—liner plates 705, 706, 707
Zone D—liner plates 708, 709

In this case, providing at least one liner plate 701, 703, 706, 708 would be in the form of a removable liner plate 112B. This allows at least one liner plate in each zone to be easily removed, allows the general wear in each zone to be easily assessed.

In particular, as such liner plates 112B can be totally removed from the outside of the conveyor system, this can be achieved without an operator inserting any part of their body into the conveyor system. Consequently, at least basic checking of liner plate wear in each of the zones A, B, C, D can be achieved by removing the removable liner plates 701, 703, 706, 708, allowing the check to be performed in a safe manner. In the event that any of these liner plates demonstrate significant wear, then remaining liner plates can be removed as described above. This vastly enhances the safety of general monitoring requirements.

The above described example is for the purpose of illustration only and a number of variations are envisaged.

For example, whilst two rubber seals are shown in this example, a single seal may be used, and in some circumstances where dust retention is less of an issue, the rubber seals can be completely omitted.

In the above example, every other second liner plate 112B is removable. However, this is not essential, and any number of second liner plates 112 could be mounted on suitable support member 210, thereby allowing at least one second liner plate to be removed without requiring access to the inside of the conveyor system. It will be appreciated that the number of liner plates so mounted will vary depending on the preferred implementation, and a number of other factors, such as the length of the conveyor system, the wear rate of the liner plates, and the like.

In this example, first and second liner plates are used, however this is not essential, and a single set of liner plates 112 may be used. In this example, in which first liner plates 111 are provided, these positioned further away from the conveyor belt 104, and consequently suffer less wear. As a result there is less need to remove the first liner plates 111, and a similar removal system through the use of a support member 111 is not generally required. However, such as system can also be provided.

In the above example, the rubber seals 115, 116 and the support members 210 are held in place by an eye and wedge clamping arrangement. Whilst this is convenient as it allows easy removal and replacement of the seals 115, 116, and the support members 210, any suitably clamping arrangement may be used, such as mounting bolts, or the like. However, the wedge arrangement is particularly suitable as it does not rely on rotatable or threaded elements, and therefore typically does not suffer from seizures caused by the presence of dust or the like.

Whilst the above example focuses on the application to conveyor belt systems, it will be appreciated that a similar arrangement may be employed with any material transport system.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A skirt for a material transport system, the skirt including:
    a) a number of liner plates mounted on a first side of a body so as to face the transport system in use; and,
    b) at least one liner plate mounted on a support member, the support member being removably mounted to the body, to allow the at least one liner plate to be detached from the body from a second side of the body opposite the first side, wherein the support member includes at least two tongues adapted to cooperate with corresponding eyes on the body such that insertion of a wedge into each eye retains the support member in place.

2. A skirt according to claim 1, wherein when the support member includes tabs, and the body includes guides positioned on the second side, the tabs and guides cooperating to assist in aligning the support member.

3. A skirt according to claim 1, wherein the body defines an opening extending from the second side to the first side, and wherein the support member is supported by the second side of the body, wherein the support member extends through the opening.

4. A skirt according to claim 3, wherein when the support member is removed from the body, the opening provides access to the first side of the body.

5. A skirt according to claim 4, wherein the opening allows the number of liner plates to be removed from the body.

6. A skirt according to claim 1, wherein the body includes a number of liner plate supports, some of the number of liner plates being bolted to the liner plate supports.

7. A skirt according to claim 6, wherein an opening is provided between adjacent liner plate supports, the opening extending from the second side to the first side, and wherein the support member is supported by the second side of the body, wherein the support member extends through the opening.

8. A skirt according to claim 1, wherein the skirt includes at least one rubber seal removably mounted to the second side of the body, and wherein, in use, the rubber seal is removed to provide access to the at least one liner plate.

9. A skirt according to claim 8, wherein the eyes are provided on the second side of the body such that insertion of each wedge into a corresponding eye retains the seal in place.

10. A skirt according to claim 1, wherein the skirt includes a first rubber seal spaced from a second rubber seal, wherein the first rubber seal and the second rubber seal are removably mounted to the second side of the body, and wherein, in use, each rubber seal is removed to provide access to the at least one liner plate.

11. A skirt according to claim 1, wherein the skirt includes a number of wear zones and wherein at least one liner plate in each zone is removably mounted to the body so as to allow the at least one liner plate to be detached from the body from a second side of the body opposite the first side.

12. A skirt according to claim 1, wherein the material transport system is a conveyor belt.

13. A material transport system for transporting material, the material transport system a skirt, the skirt including a number of liner plates mounted on a first side of a body so as to face the transport system in use, and at least one liner plate mounted on a support member, the support member being removably mounted to the body so as to allow the at least one liner plate to be detached from the body from a second side of the body opposite the first side, wherein the support member includes at least two tongues adapted to cooperate with corresponding eyes on the body such that insertion of a wedge into each eye retains the support member in place.

14. A material transport system according to claim 13, wherein the material transport system is substantially enclosed.

15. A skirt for a material transport system, the skirt including:
    a) a number of liner plates mounted on a first side of a body so as to face the transport system in use;
    b) at least one liner plate mounted on a support member, the support member being removably mounted to the body, to allow the at least one liner plate to be detached from the body from a second side of the body opposite the first side; and
    c) a first rubber seal spaced from a second spaced rubber seal, wherein the first rubber seal and the second rubber seal are removably mounted to the second side of the body, wherein, in use, each rubber seal is removed to provide access to the at least one liner plate.

16. A skirt according to claim 15, wherein when the support member includes tabs, and the body includes guides positioned on the second side, the tabs and guides cooperating to assist in aligning the support member.

17. A skirt according to claim 15, wherein the body defines an opening extending from the second side to the first side, and wherein the support member is supported by the second side of the body, wherein the support member extends through the opening.

18. A skirt according to claim 17, wherein when the support member is removed from the body, the opening provides access to the first side of the body.

19. A skirt according to claim 18, wherein the opening allows the number of liner plates to be removed from the body.

20. A skirt according to claim 15, wherein the body includes a number of liner plate supports, some of the number of liner plates being bolted to the liner plate supports.

21. A skirt according to claim 20, wherein an opening is provided between adjacent liner plate supports, the opening extending from the second side to the first side, and wherein the support member is supported by the second side of the body, wherein the support member extends through the opening.

22. A skirt according to claim 15, wherein the body includes a number of eyes provided on the second side of the body such that insertion of each wedge into a corresponding eye retains the first rubber seal and second rubber seal in place.

23. A skirt according to claim 15, wherein the skirt includes a number of wear zones and wherein at least one liner plate in each zone is removably mounted to the body so as to allow the at least one liner plate to be detached from the body from a second side of the body opposite the first side.

24. A skirt according to claim 15, wherein the material transport system is a conveyor belt.

* * * * *